(12) United States Patent
Maroy et al.

(10) Patent No.: US 8,615,117 B2
(45) Date of Patent: Dec. 24, 2013

(54) METHOD FOR ESTIMATING THE CONCENTRATION OF A TRACER IN A TISSUE STRUCTURE ASSEMBLY, AND CORRESPONDING STORAGE MEDIUM AND DEVICE

(75) Inventors: Renaud Maroy, Paris (FR); Bertrand Tavitian, Paris (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 175 days.

(21) Appl. No.: 13/125,915

(22) PCT Filed: Sep. 18, 2009

(86) PCT No.: PCT/FR2009/051764
§ 371 (c)(1),
(2), (4) Date: Sep. 13, 2011

(87) PCT Pub. No.: WO2010/046573
PCT Pub. Date: Apr. 29, 2010

(65) Prior Publication Data
US 2011/0317889 A1 Dec. 29, 2011

(30) Foreign Application Priority Data
Oct. 24, 2008 (FR) .................................. 08 57251

(51) Int. Cl.
*G06K 9/00* (2006.01)
(52) U.S. Cl.
USPC ........................................................ 382/128
(58) Field of Classification Search
None
See application file for complete search history.

(56) References Cited

U.S. PATENT DOCUMENTS 5,168,375 A * 12/1992 Reisch et al. .................. 382/250
6,026,191 A * 2/2000 Ohara ............................ 382/232
2011/0317889 A1* 12/2011 Maroy et al. .................. 382/128

OTHER PUBLICATIONS

PCT International Search Report for PCT/FR2009/051764, mailed on Feb. 9, 2010.
Maroy et al., 2008, "Fast and accurate PET preclinical data analysis: Segmentation and Partial Volume Effect correction with no anatomical priors", Nuclear Science Symposium Conference Record: 5498-5501.

(Continued)

*Primary Examiner* — Claire X Wang
(74) *Attorney, Agent, or Firm* — Kenyon & Kenyon LLP

(57) ABSTRACT

A method provides for estimating the concentration of a tracer in a tissue structure assembly including at least one tissue structure, from a measurement image of the tracer concentration in said tissue structure assembly, which is obtained by an imaging apparatus, wherein said image includes at least one space domain inside which the tracer concentration is homogenous and at least one region of interest in which the tracer concentration is measured. The method includes: determining a geometric transfer matrix having coefficients representative of the contribution of the space domains in the measurement of the tracer concentration in the regions of interest; optimizing the coefficient of the geometric transfer matrix by defining the best regions of interest in terms of errors in order to measure the tracer concentration, the definition of the regions of interest being carried out according to an iterative loop that includes the following steps upon each iteration: modifying the regions of interest, and calculating the coefficients of the geometric transfer matrix from the modified regions of interest; selecting an optimized geometric transfer matrix among the calculated geometric transfer matrices; and estimating the tracer concentration from the optimized geometric transfer matrix.

17 Claims, 11 Drawing Sheets

(56) References Cited

OTHER PUBLICATIONS

Frouin et al., 2002, "Correction of Partial Volume Effect for PET Striatal Imaging: Fast Implementation and Study of Robustness", Robustness of GTM PVE Correction, 43(12):1715-1726.

Maroy et al., 2008, "Segmentation of Rodent Whole-Boday Dynamic PET Images: An Unsupervised Method Based on Voxel Dynamics", IEEE Transactions on Medical Imaging, 27(3): 343-354.

Rousset et al, 2007, "Partial Volume Correction Strategies in PET", Positron Emission Tomography, 2(2): 235-249.

* cited by examiner

METHOD FOR ESTIMATING THE CONCENTRATION OF A TRACER IN A TISSUE STRUCTURE ASSEMBLY, AND CORRESPONDING STORAGE MEDIUM AND DEVICE

FIELD OF THE INVENTION

The present invention relates to a method for estimating the concentration of a tracer in a tissue structure assembly comprising at least one tissue structure, from a measurement image of the tracer concentration in said tissue structure assembly, which is obtained by an imaging apparatus, the image comprising at least one space domain inside which the tracer concentration is homogenous and at least one region of interest inside which the tracer concentration is measured.

BACKGROUND

In vivo molecular imaging makes it possible to measure local biochemical and pharmacological parameters non-invasively in intact animals and humans. Molecular imaging includes nuclear techniques, magnetic resonance imaging (MRI), and optical techniques. Among nuclear techniques, positron emission tomography (PET) is the most sensitive technique and the only one to offer quantitative measurements.

The quantification of measurements with PET for the study of a drug requires the intravenous injection of a radioactive tracer adapted to the study of that drug. An image of the tracer distribution is then reconstructed. The time activity curves (TAC), i.e. the variations of the tracer concentration within a volume element, are also highly spatially correlated due not only to the reconstruction method, but also to the existence of physiological regions that respond to the tracer identically, regions that can be called pharmaco-organs.

The post-processing of the PET image generally requires three steps to access the pharmacological parameter. First, regions of interest (ROI) defining the organs, more precisely the pharmacokinetic organs, must be defined either on the PET image or on a high-resolution image matched point-to-point with the PET image. Next, the TACs of the pharmaco-organs must be extracted and possibly corrected to offset the limited spatial resolution of the PET. Lastly, a physiological model can be defined, based on the TACs and the tracer concentration in the plasma, making it possible to calculate pharmacological parameters that are interesting for the biologist. A precise definition of the ROIs is necessary so as to extract the relevant TACs.

However, the quantification of the TACs is hindered by the limited resolution of the PET system, resulting in what is called the partial volume effect (PVE).

A known geometric transfer matrix (GTM) method makes it possible to correct the PVE effectively. This method requires the data from the PET image on one hand, and on the other hand, space domains defining the functional organs, regions of interest within which the average TACs of the functional organs will be calculated, and a resolution model of the PET imager.

However, this GTM method is very sensitive not only to the definition errors of said space domains and the image reconstruction artifacts, but also to the image smoothing effects due to periodic physiological movements, such as heartbeats or respiratory movements.

SUMMARY

The present invention aims to propose a method making it possible to limit the impact of the effects due to segmentation errors, image reconstruction artifacts, and physiological movements on the effectiveness of the GTM method in order to obtain TACs having the smallest possible bias with the lowest uncertainty due to noise.

To that end, the present invention relates to a method of the aforementioned type, wherein the method comprises the following steps:

determining a geometric transfer matrix having coefficients representative of the contribution of the space domains in the measurement of the tracer concentration in the regions of interest;

optimizing the coefficients of the geometric transfer matrix by defining the best regions of interest in terms of errors in order to measure the tracer concentration, the definition of the regions of interest being carried out according to an iterative loop that includes the following steps upon each iteration:

modifying the regions of interest; and calculating the coefficients of the geometric transfer matrix from the modified regions of interest;

selecting an optimized geometric transfer matrix among the calculated geometric transfer matrices; and estimating the tracer concentration from the optimized geometric transfer matrix.

The method according to the present invention may include one or more of the following features:

the step for modifying the regions of interest comprises the addition and/or exclusion of at least one image element;

the iterative loop for defining the regions of interest comprises, for each iteration, the following steps:

determining a set of elementary modifications each including or consisting of adding at least one image element to the regions of interest;

estimating, for each elementary modification, the tracer concentration in the regions of interest modified by the elementary modification;

evaluating, for each elementary modification, a criterion making it possible to compare the estimated tracer concentration with the tracer concentrations estimated in at least one preceding iteration;

selecting the elementary modification yielding a tracer concentration estimate closest to the tracer concentrations estimated in the preceding iterations;

comparing the criterion corresponding to the selected elementary modification with a predetermined threshold; and applying or not applying the selected elementary modification or stopping the iterative loop as a function of the result of the comparison of the criterion with the threshold;

the method comprises a step for ordering image elements in each space domain as a function of order criteria making it possible to evaluate their risk of introducing errors not due to noise into the tracer concentration estimate;

the order criteria comprise at least one from amongst a first criterion making it possible to define whether the concentration contained in the image element comes from one or more different spatial domains, a second criterion making it possible to define whether the image element participates in the calculation of the non-diagonal elements of the geometric transfer matrix, and a third criterion making it possible to define whether the image element is reliable for estimating the tracer concentration;

the first criterion makes it possible to measure the homogeneity of the tracer concentration near the image element, the second criterion makes it possible to measure the contribution of the space domains to the measurement of the tracer concentration in the image element, and the third criterion comes from a probabilistic atlas;

the iterative loop for defining the regions of interest is carried out following the order of the image elements obtained in the ordering step;

the method comprises a step for estimating the point spread function of the imaging apparatus at any point of the imaging apparatus's field of view;

the step for estimating the point spread function comprises the following steps:
measuring the point spread function at several points of the field of view; and
interpolating and/or extrapolating the obtained measurements;

the method comprises a step for estimating a region spread function for each space domain by convolution of the point spread function with each space domain;

the method comprises a step for calculating the size of the regions of interest;

the method comprises a step for delimiting space domains so as to obtain regions of interest with a maximum size;

the method comprises a step for optimizing order criteria so as to obtain regions of interest with a maximum size;

the measurement image of the tracer concentration in the tissue structure is a sequence of matched three-dimensional images and comprising at least one three-dimensional image, and the image elements are voxels; and the three-dimensional image is obtained by positron emission tomography.

The present invention also relates to a storage medium comprising a code to estimate the concentration of a tracer in a tissue structure assembly comprising at least one tissue structure from a measurement image of the tracer concentration in said tissue structure assembly obtained by an imaging apparatus, the image comprising at least one space domain inside which the tracer concentration is homogenous and at least one region of interest inside which the tracer concentration is measured, wherein the code comprises instructions to:
determine a geometric transfer matrix having coefficients representative of the contribution of the space domains in the measurement of the tracer concentration in the regions of interest;
optimize the coefficients of the geometric transfer matrix by defining the best regions of interest in terms of errors in order to measure the tracer concentration, the definition of the regions of interest being carried out according to an iterative loop that includes the following steps upon each iteration:
modifying the regions of interest; and
calculating the coefficients of the geometric transfer matrix from the modified regions of interest;
select an optimized geometric transfer matrix among the calculated geometric transfer matrices; and
estimate the tracer concentration from the optimized geometric transfer matrix,
when it is executed by a data processing system.

The present invention also relates to a device intended to estimate the concentration of a tracer in a tissue structure assembly comprising at least one tissue structure from a measurement image of the tracer concentration in said tissue structure assembly obtained by an imaging apparatus, the image comprising at least one space domain inside which the tracer concentration is homogenous and at least one region of interest inside which the tracer concentration is measured, wherein the device comprises:

an imaging apparatus; and
a data processing system comprising:
means for determining a geometric transfer matrix having coefficients representative of the contribution of the space domains in the measurement of the tracer concentration in the regions of interest;
means for optimizing the coefficients of the geometric transfer matrix by defining the best regions of interest in terms of errors in order to measure the tracer concentration, the definition of the regions of interest being carried out according to an iterative loop that includes the following steps upon each iteration:
modifying the regions of interest; and
calculating the coefficients of the geometric transfer matrix from the modified regions of interest;
means for selecting an optimized geometric transfer matrix among the calculated geometric transfer matrices; and
means for estimating the tracer concentration from the optimized geometric transfer matrix.

The present invention will be better understood upon reading the following description, provided solely as an example and done in reference to the appended drawings.

BRIEF DESCRIPTION OF THE DRAWINGS

FIGS. 7A to 11B are diagrams showing the results obtained with one example of an embodiment of the inventive method.

DETAILED DESCRIPTION

The present invention is based on the geometric transfer matrix (GTM) method of correcting the partial volume effect (PVE) proposed by Rousset et al. in the article "Correction for Partial Volume Effects in PET: Principle and Validation", *The Journal of Nuclear Medicine*, 1998, Vol. 39, No. 5, pages 904 to 911, and implemented in the image area by Frouin et al. in the article "Correction of Partial-Volume Effect for PET Striatal Imaging: Fast Implementation and Study of Robustness", *The Journal of Nuclear Medicine*, 2002, Vol. 43, No. 12, pages 1715 to 1726.

The aim of the GTM method is to find the true tracer concentration $T_i$ inside the space domains $D_i$. The details of the GTM method can be found in the aforementioned article by Rousset et al., but the principles are presented here so as to better highlight the features of the present invention.

The method according to the present invention aims to optimize the calculation parameters of the true tracer concentration $T_i$ by limiting the effects due to segmentation errors, artifacts from reconstructing the image, and physiological movements.

Figure 1:
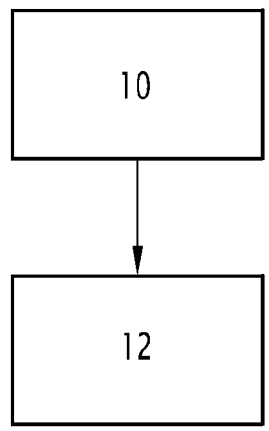
FIG. 1 is a flowchart showing the two main phases of the inventive method.

As shown in FIG. 1, the method according to the present invention comprises two main phases:
a first phase 10 intended to suitably select the response function of the PET scanner; and
a second phase 12 intended to choose the optimal regions of interest for estimating the true tracer concentration $T_i$.

Figure 2:
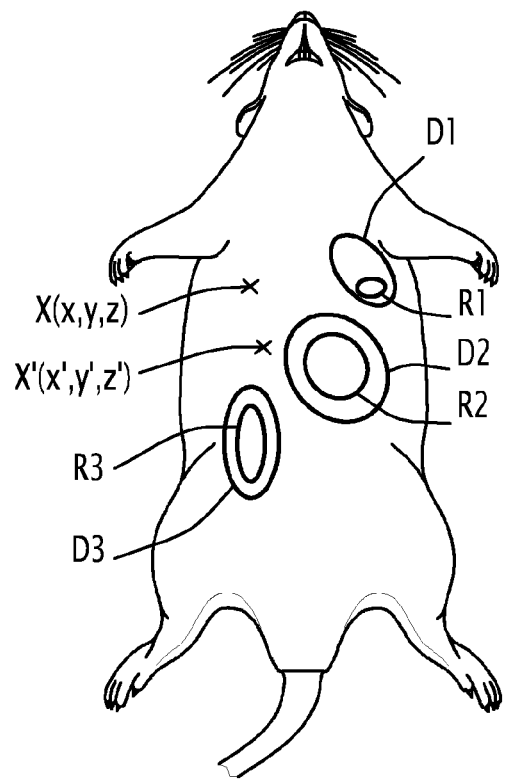
FIG. 2 is a diagram illustrating the PET image of a mouse.

In reference to FIG. 2, the PET image is a three-dimensional image formed from a set of voxels X(x,y,z) each characterized by a tracer concentration A(x,y,z), said concentration being capable of varying over time.

The PET image is assumed to be made up of I homogenous space domains $\{D_i\}_{1 \le i \le I}$ in terms of tracer concentration. Each space domain $D_i$ has a true tracer concentration denoted $T_i$.

A tracer concentration $\{t_j\}_{1 \le j \le J}$ is measured in the PET image inside regions of interest (ROI) $\{R_j\}_{1 \le j \le J}$.

For clarity of the explanation, we will hereafter consider that each ROI is included in the corresponding space domain and that their numbers are equal: J=I.

Alternatively, J is different from I, preferably with J≥I so that the GTM method makes it possible to find the true concentration $T_i$ of the tracer.

The measured tracer concentration $t_j$ in a region of interest $R_j$, with volume $V_j$, can be expressed as a linear combination of the tracer concentrations $\{T_j\}_{1 \le i \le I}$ in the different space domains:

$$t_j = \frac{1}{V_j} \sum_{i=1}^{I} T_i \times \int_{R_j} RSF_i(x)\,dx \qquad (1)$$

where $RSF_i(x)$ is the contribution of the space domain $D_i$ to the PET measurement of the tracer concentration in voxel x.

This equation can be rewritten in matricial form:

$$t = W \cdot T \qquad (2)$$

where t is the vector of the averaged tracer concentration PET measurements in the ROIs $R_j$, T is the vector of the true tracer concentrations in the space domains $D_i$, and W is the geometric transfer matrix (GTM) I×J between the space domains $\{D_i\}_{1 \le i \le I}$ and the ROIs $\{R_j\}_{1 \le j \le J}$.

The coefficients $w_{i,j}$ of the matrix W are equal to:

$$w_{i,j} = \frac{1}{V_j} \int_{R_j} RSF_i(x)\,dx \qquad (3)$$

The true tracer concentration can then be calculated as:

$$T = W^{-1} \cdot t \qquad (4)$$

Figure 3:
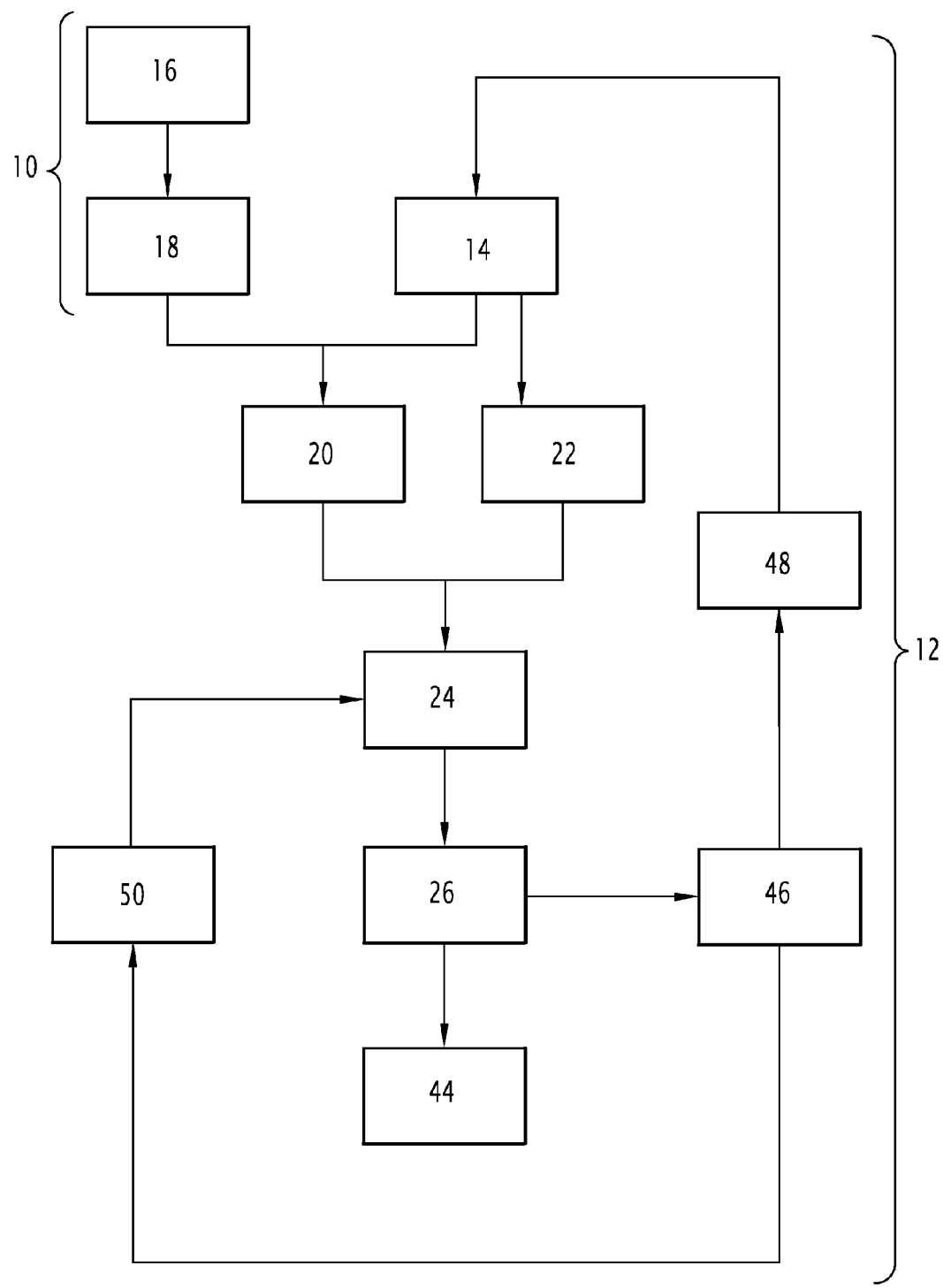
FIG. 3 is a flowchart showing the steps of the inventive method.

As illustrated in FIG. 3, an initial step 14 of the phase 12 of the inventive method consists of defining the space domains $D_i$.

The user is free to define the $D_i$ as he wishes, by drawing them manually, semi-automatically, or automatically on the PET image, but with the constraint that each space domain $D_i$ is homogenous in terms of true tracer concentration, this concentration being able to vary over time in the case where the PET image contains dynamic information.

Alternatively, the $D_i$ are drawn on an image coming from another imaging form, such as nuclear MRI or X-ray scanner.

In parallel, the phase 10 for selecting the response function of the PET scanner is carried out.

The response function of the scanner, or point spread function (PSF), is preferably estimated so that the GTM method works effectively.

Figure 4:
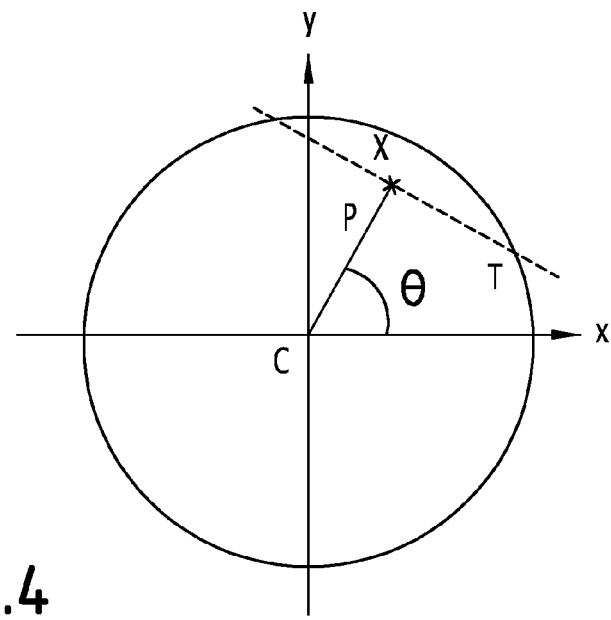
FIGS. 4 and 5 are respective transaxial and longitudinal cross-sections of the field of view of the PET scanner.
Figure 5:
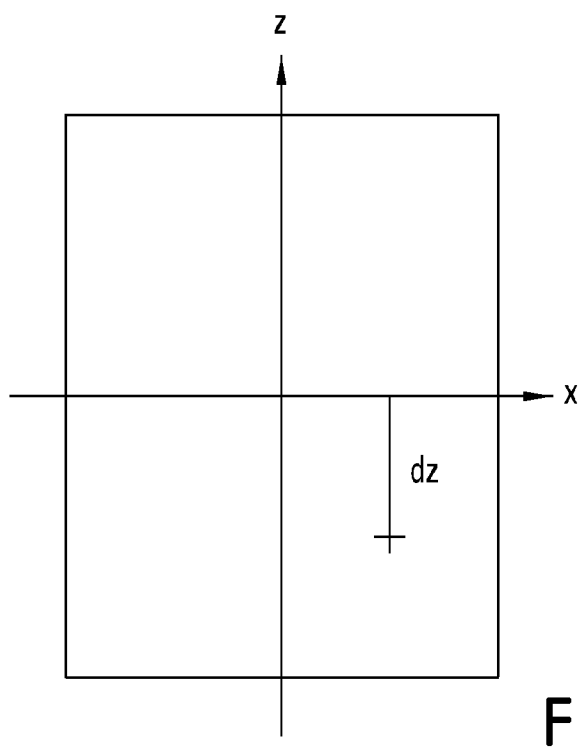

In reference to FIGS. 4 and 5, the PSF is broken down in a cylindrical coordinate system $(\rho, \theta, z)$ into:

an axial component along the z axis: $PSF_{axial}$;
a radial component in direction CX: $PSF_{radial}$; and
a tangential component in direction XT: $PSF_{tangential}$.

The components $PSF_{axial}$, $PSF_{radial}$ and $PSF_{tangential}$ of the PSF can each comprise several parameters, for example two variances of two gaussians if the PSF is estimated by two gaussians, or several values.

If we assume that the PSF is invariable along z, it is only necessary to measure the PSF on the transaxial plane passing through the middle of the PET scanner. According to this hypothesis, $PSF_{axial}$ does not vary with the position in the field of view, and $PSF_{radial}$ and $PSF_{tangential}$ are also invariable along $\theta$. It is therefore sufficient to measure $PSF_{axial}$ at a point of the field of view, and $PSF_{radial}$ and $PSF_{tangential}$ at several points of the x axis.

If one assumes that the PSF varies as one moves towards the axis of the PET scanner, it is necessary to measure $PSF_{axial}$ at several points on the z axis, and $PSF_{radial}$ and $PSF_{tangential}$ at several points on the x axis.

In reference to FIG. 3, a first step 16 of phase 10 of the inventive method consists of measuring $PSF_{axial}$, $PSF_{radial}$ and $PSF_{tangential}$ at several points of the field of view of the PET scanner.

According to the present invention, the PSF may have any parametric or non-parametric form, or more precisely a form in line with the PSF form generated by the method for reconstructing the PET image, and possibly also with the smoothing effect carried out by the physiological movements. If the PET image is reconstructed with modeling or compensation of the PSF, the PSF in the context of the present invention will model the residual effects not taken into account during the reconstruction (for example if the reconstruction assumes the PSF to be uniform in the field of view, then the deviation for each point or region of the field of view between the uniform PSF and the actual PSF will be modeled).

In a second step 18 of phase 10, the value of $PSF_{axial}$, $PSF_{radial}$ and $PSF_{tangential}$ is deduced from these measurements at all points of the field of view by interpolation and/or extrapolation, using a method selected by the user.

As previously seen, $PSF_{axial}$ only depends on the position on the z axis and will be denoted $PSF_{axial}(z)$, whereas $PSF_{radial}$ and $PSF_{tangential}$ only depend on $\rho$ and will therefore be denoted $PSF_{radial}(\rho)$ and $PSF_{tangential}(\rho)$.

In step 20 of the inventive method, $RSF_i(x)$ will be estimated at all points of the field of view.

This estimate is obtained by convolution of the convolution mask corresponding to the PSF with the voxels of the space domain $D_i$.

The convolution mask corresponding to the PSF of the PET scanner is obtained as follows:

Let $C = (x_c, y_c)$ and $X = (x, y, z)$ respectively be the coordinates of the axis of the scanner and those of a voxel situated in the field of view of the scanner.

Let $\delta X = (\delta x, \delta y, \delta z)$ be a small movement around X.

The value in $X + \delta X$ of the convolution mask corresponding to the PSF in X is given by:

$$PSF_{x,y,z}(\delta x, \delta y, \delta z) = f(\delta r, PSF_{radical}(\rho), \delta t, PSF_{tangential}(\rho), z, PSF_{axial}(z)) \qquad (5)$$

where
$\delta r = \delta x \cos \theta + \delta y \sin \theta$,
$\delta t = -\delta x \sin \theta + \delta y \cos \theta$, $\cos \theta = (x-x_c)/\|X-C\|$, $\sin \theta = (y-y_c)/\|X-C\|$, and f is the function representing the look of the PSF.

$RSF_i(x)$ is obtained by applying the convolution mask $PSF_{x,y,z}(\delta x, \delta y, \delta z)$ to the mask of $D_i$. This smoothing is non-homogenous and reproduces the effects produced by the acquisition and reconstruction of the image.

In parallel, in step 22, one defines a set $\Lambda_i$ of voxels for which the activity measured in their vicinity is representative of the tracer concentration in the space domain $D_i$. These voxels can be determined automatically or manually.

$S_i$ is also defined as a set of voxels to be excluded from the regions of interest $R_j$.

The voxels in each space domain $D_i$ are then ordered in step 24 according to the following principle.

At least one voxel $x \in D_i$ is affected by the effects that smooth the images (partial volume effect, fraction of tissue in the voxel, physiological movement, etc.).

It is possible to predict, with or without introducing a priori information, in which ratio this voxel x is affected by these effects from one or more predetermined order criteria.

Among these criteria:

criterion $\alpha(x)$: the voxel x is affected by the partial volume effect, the tissue fraction or the periodic physiological movements of the subject, this criterion making it possible to define in other terms whether the activity contained in the voxel x comes from only one or several different space domains;

criterion $\beta(x)$: the voxel x participates in calculating non-diagonal elements of the matrix W, this criterion being easily calculated from the calculation of the $RSF_k(x)$ for $k \neq i$;

criterion $\gamma(x)$: any other criterion or set of criteria that can help discriminate the most reliable voxels for estimating the tracer concentration (reliability of the PET measurement, response homogeneity within a same organ, etc.), for example from a probabilistic atlas.

The criteria $\alpha(x)$, $\beta(x)$ and $\gamma(x)$ are defined so that the smaller they are, the lesser the aggregation of x in the region of interest $R_I$ will introduce correction error due to the segmentation errors or the effects not taken into account in estimating the PSF.

Let $g_i(\alpha(x), \beta(x), \gamma(x), \Lambda_i, S_i)$ be an order of the voxels $x \in D_i$ giving x a lower rank as $\alpha(x)$, $\beta(x)$ and $\gamma(x)$ are smaller, with the constraint that:

(C1) A voxel $x \in D_i$ of rank n is connected by lower rank voxels to one of the points of $\Lambda_i$; and (C2) The voxels $y \in S_i$ are excluded from this sort order.

Hereafter, $R_i^{(n)}$ will designate a ROI containing the smallest n voxels with ranks $g_i(\alpha(x), \beta(x), \gamma(x))$ among all of the voxels of $D_i$ or part of those voxels.

$R_i^{(n)}$ can also contain voxels situated outside $D_i$ but on the periphery thereof.

The automatic optimization of the regions of interest $R_j$ is then carried out in step 26 of the inventive method using an iterative loop.

The parameters are first defined that are useful for the automatic optimization of the regions of interest $R_j$.

Let $R'_i \subset R_i$ let $\hat{T}'$ and $\hat{T}$ be the estimated tracer concentrations in the organs with $R'_i$ and with $R_i$ respectively. Let T be the true tracer concentration. It can be put forward that:

The errors due to segmentation errors on the estimate of T by using $R'_i$ are less significant that those committed using $R_i$. Furthermore, the geometric transfer matrix W' estimated using $R'_i$ is closer to the unit matrix than the geometric transfer matrix W estimated using $R_i$. The conditioning of the matrix W' is better than that of W.

The errors due to noise made on the estimate of T using $R'_i$ are more significant than those committed using $R_i$.

It is possible to estimate $T_{i,k,\tau}$, which is the tracer concentration in the region of interest $R_i$ for iteration k and measurement time $\tau$:

either by optimizing $R_i$ globally by incorporating the information for all of the measurement times (hereafter called "frames");

or by optimizing $R_i$ separately for each frame $\tau$;

or by optimizing $R_i$ separately for each frame $\tau_{opt}$ while also integrating information coming from other frames $\tau_{mes}$.

The last case corresponds to a general case, and the first two cases are specific cases thereof. We will therefore only consider the general case below.

$R_{i,S_{i,k}}^{(n_{i,k})}$ is defined beforehand as the ROI containing in iteration k the $n_{i,k}$ voxels having the smallest rank voxels x among all of the voxels of $D_i$, excluding voxels belonging to the set $S_{i,k}$.

Let $\delta$ be an elementary modification of the number of voxels of the regions of interest $R_i$ and let $\Delta_k$ be a set of possible elementary modifications in iteration k.

Let $$R_{i,S_{i,k,\tau_{opt}}}^{(n_{i,k,\tau_{opt}})}$$

be the ROI defined in iteration k to optimize the region of interest $R_i$ for the frame $\tau_{opt}$, containing $n_{i,k,\tau_{opt}}$ voxels and excluding the voxels from the set $S_{i,k,\tau_{opt}}$ while remaining compliant with (C1) and (C2).

Let $T_{i,k,\tau_{opt}}$ be the tracer concentration one wishes to estimate for the frame $\tau_{opt}$ and let $T_{i,k,\tau_{opt},\tau_{mes}}$ be the tracer concentration estimated in $$R_{i,S_{i,k,\tau_{opt}}}^{(n_{i,k,\tau_{opt}})}$$

at time $\tau_{mes}$.

Let $\sigma_{x,\tau_{mes}}^2$ be the variance of the noise at the voxel x at time $\tau_{mes}$. This variance can be determined as a function of the image reconstruction algorithm and possibly the PET signal measured at voxel x at time $\tau_{mes}$.

Let $t_{i,k,\tau_{opt},\tau_{mes}}$ be the average tracer concentration measured in the region of interest $R_i$ at iteration k at time $\tau_{mes}$ to estimate $T_{i,k,\tau_{opt}}$.

In certain hypotheses, the variance $\zeta_{i,k,\tau_{opt},\tau_{mes}}^2$ of the error due to noise made on the estimate of $t_{i,k,\tau_{opt},\tau_{mes}}$ can also be determined from $\sigma_{x,\tau_{mes}}^2$ and from $n_{i,k,\tau_{opt}}$.

Knowing this error, the GTM method provides an upper limit for the variance $\xi_{i,k,\tau_{opt},\tau_{mes}}^2$ of the error due to noise made on the estimate of $T_{i,k,\tau_{opt}}$.

$$\xi^2_{i,k,\tau_{opt},\tau_{mes}} = \sum_{i=1}^{I} W^{-1}_{k,\tau_{opt}} \times \zeta^2_{i,k,\tau_{opt},\tau_{mes}} \qquad (6)$$

where $W_{k,\tau_{opt}}$ is the GTM matrix calculated in iteration k to estimate $\{T_{i,k,\tau_{opt}}\}_{1 \le i \le I}$.

Let $$h\Big(\{T_{i,k,\tau_{opt},\tau_{mes}}\}_{1 \le \tau_{mes} \le T, 1 \le i \le I}, \{\xi^2_{i,k,\tau_{opt},\tau_{mes}}\}_{1 \le \tau_{mes} \le T, 1 \le i \le I},$$

$$\{T_{i,l,\tau_{opt},\tau_{mes}}\}_{1 \le l < k, 1 \le \tau_{mes} \le T, 1 \le i \le I}, \{\xi^2_{i,l,\tau_{opt},\tau_{mes}}\}_{1 \le l < k, 1 \le \tau_{mes} \le T, 1 \le i \le I}\Big) \text{ of}$$

$$\{T_{i,k,\tau_{opt},\tau_{mes}}\}_{1 \le \tau_{mes} \le T, 1 \le i \le I}$$

be a quantitative criterion evaluating the difference related to the noise between the estimate at iteration k and the estimates of $$\{T_{i,l,\tau_{opt},\tau_{mes}}\}_{1 \le l < k, 1 \le \tau_{mes} \le T, 1 \le i \le I}$$

in the preceding iterations.

The greater the difference between $$\{T_{i,k,\tau_{opt},\tau_{mes}}\}_{1 \le \tau_{mes} \le T, 1 \le i \le I} \text{ and } \{T_{i,l,\tau_{opt},\tau_{mes}}\}_{1 \le l < k, 1 \le \tau_{mes} \le T, 1 \le i \le I},$$

the smaller the values of h.

Let $h_{min}$ be a threshold below which $$\{T_{i,k,\tau_{opt},\tau_{mes}}\}_{1 \le \tau_{mes} \le T, 1 \le i \le I}$$

is considered to be significantly different from $$\{T_{i,l,\tau_{opt},\tau_{mes}}\}_{1 \le l < k, 1 \le \tau_{mes} \le T, 1 \le i \le I}.$$

Figure 6:
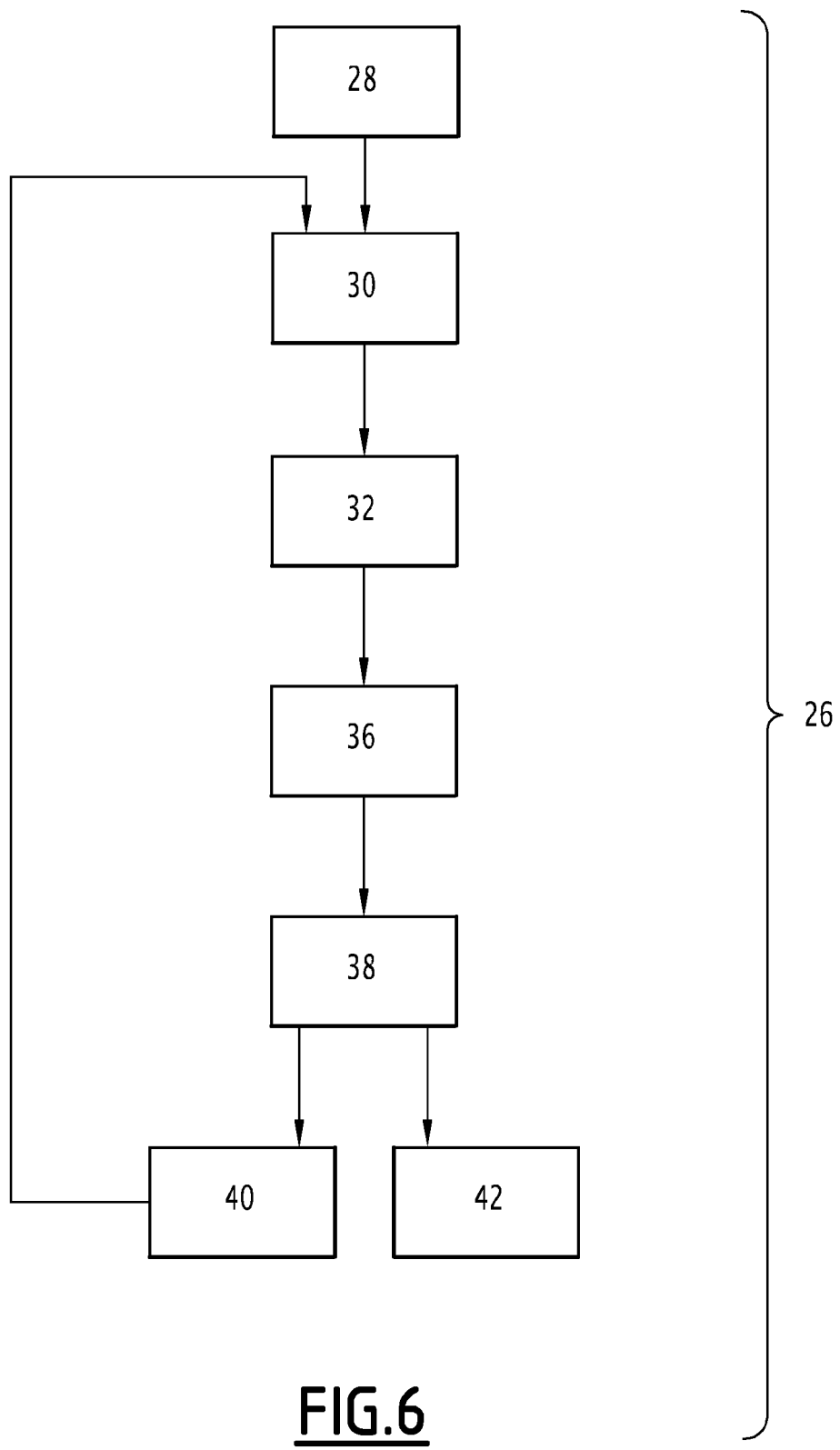
FIG. 6 is a flowchart showing the step for defining the regions of interest in more detail.

The algorithm of the iterative loop for optimizing regions of interest $R_j$ is the following (FIG. 6).

Step 28 corresponds to the initialization of the loop. The regions of interest $R_j$ are initialized by $$R^{(n_{i,0,\tau_{opt}})}_{i,S_{i,0,\tau_{opt}}},$$

where $n_{i,0,\tau_{opt}} > 2$ and where $S_{i,0}$ is an empty set.

In each iteration k, one then goes on to a step 30 for determining a set $\Delta_k$ of possible elementary modifications $\delta$ of the $$\{R^{(n_{i,k-1,\tau_{opt}})}_{i,S_{i,k-1,\tau_{opt}}}\}_{1 \le i \le I}$$

that can result in the addition of voxels to a region of interest $R_i$ and/or in the addition of voxels to $S_i$ and/or in the modification of $\Lambda_i$.

In step 32, for all $\delta \in \Delta$, one calculates $\{t_i^{(\delta)}\}_{1 \le i \le I}$, W, $$\{T^{(\delta)}_{i,k,\tau_{opt},\tau_{mes}}\}_{1 \le \tau_{mes} \le T, 1 \le i \le I}, \{\xi^{2(\delta)}_{i,k,\tau_{opt},\tau_{mes}}\}_{1 \le \tau_{mes} \le T, 1 \le i \le I} \text{ and}$$

$$h\left(\begin{array}{l}\{T^{(\delta)}_{i,k,\tau_{opt},\tau_{mes}}\}_{1 \le \tau_{mes} \le T, 1 \le i \le I}, \{\xi^{2(\delta)}_{i,k,\tau_{opt},\tau_{mes}}\}_{1 \le \tau_{mes} \le T, 1 \le i \le I},\\ \{T_{i,l,\tau_{opt},\tau_{mes}}\}_{1 \le l < k, 1 \le \tau_{mes} \le T, 1 \le i \le I}, \{\xi^2_{i,l,\tau_{opt},\tau_{mes}}\}_{1 \le l < k, 1 \le \tau_{mes} \le T, 1 \le i \le I}\end{array}\right).$$

In step 36, the elementary modification $\delta_{opt}$ is selected that provides an estimate of the tracer concentration closest to the tracer concentrations estimated in the preceding iterations:

$$\delta_{opt} = \underset{\delta}{\operatorname{argmax}}\, h\left(\begin{array}{l}\{T^{(\delta)}_{i,k,\tau_{opt},\tau_{mes}}\}_{1 \le \tau_{mes} \le T, 1 \le i \le I}, \{\xi^{2(\delta)}_{i,k,\tau_{opt},\tau_{mes}}\}_{1 \le \tau_{mes} \le T, 1 \le i \le I},\\ \{T_{i,l,\tau_{opt},\tau_{mes}}\}_{1 \le l < k, 1 \le \tau_{mes} \le T, 1 \le i \le I}, \{\xi^2_{i,l,\tau_{opt},\tau_{mes}}\}_{1 \le l < k, 1 \le \tau_{mes} \le T, 1 \le i \le I}\end{array}\right) \qquad (7)$$

In step 38, the criterion h corresponding to $\delta_{opt}$ is compared with $h_{min}$.

If $$h\left(\begin{array}{l}\{T^{(\delta_{opt})}_{i,k,\tau_{opt},\tau_{mes}}\}_{1 \le \tau_{mes} \le T, 1 \le i \le I}, \{\xi^{2(\delta_{opt})}_{i,k,\tau_{opt},\tau_{mes}}\}_{1 \le \tau_{mes} \le T, 1 \le i \le I},\\ \{T_{i,l,\tau_{opt},\tau_{mes}}\}_{1 \le l < k, 1 \le \tau_{mes} \le T, 1 \le i \le I}, \{\xi^2_{i,l,\tau_{opt},\tau_{mes}}\}_{1 \le l < k, 1 \le \tau_{mes} \le T, 1 \le i \le I}\end{array}\right) > h_{min},$$

then the elementary modification $\delta_{opt}$ is applied to $R_i$ and to $S_i$ (step 40) and one goes on to the following iteration k+1 by returning to step 30.

Otherwise the algorithm ends (step 42), and we have:

$$R_i = R^{(n_{j,k-1,\tau_{opt}})}_{i,S_{i,k-1,\tau_{opt}}};$$

$$\{T_{i,\tau_{opt}}\}_{1 \le i \le I} = \{T_{i,k-1,\tau_{opt},\tau_{opt}}\}_{1 \le i \le I}; \text{ and}$$

$$\{\xi^2_{i,\tau_{opt}}\}_{1 \le i \le I} = \{\xi^2_{i,k-1,\tau_{opt},\tau_{opt}}\}_{1 \le i \le I}.$$

In reference to FIG. 3, one thus obtains, in step 44, the estimate of the true tracer concentration $T_i$ in the space domains $D_i$.

One also obtains, from step 26 for optimizing the regions of interest $R_j$, the final size of said regions of interest (step 46) that makes it possible to optimize the parameters of the method.

Indeed, the method comprises various parameters determining the order in which the voxels will be aggregated to the ROIs. These parameters include the $\Lambda_i$, the functions $\alpha(x)$, $\beta(x)$, $\gamma(x)$ and $g_i(\alpha(x), \beta(x), \gamma(x), \Lambda_i, S_i)$.

The optimization method finds a middle way between estimating errors due to noise and estimating errors due to effects such as segmentation errors and physiological movements.

The errors due to noise tend to decrease as the size of the ROIs increases.

The final size of the $R_j$ is therefore an indicator of:
the quality of the $D_i$;
the homogeneity of the PET signal within the $D_i$; and
the quality of the parameters determining the order of the voxels.

At fixed $D_i$ and homogeneity of the signal, the final size of the $R_j$ is therefore an indicator of the quality of the selection of the $\Lambda_i$, the functions $\alpha(x)$, $\beta(x)$, $\gamma(x)$ and $g_i(\alpha(x), \beta(x), \gamma(x), \Lambda_i, S_i)$.

It is then possible to:
initiate/launch several optimizations of the $R_j$ with different $D_i$, $\Lambda_i$, $\alpha(x)$, $\beta(x)$, $\gamma(x)$ and $g_i(\alpha(x), \beta(x), \gamma(x), \Lambda_i, S_i)$ and choose the $D_i$, $\Lambda_i$, $\alpha(x)$, $\beta(x)$, $\gamma(x)$ and $g_i(\alpha(x), \beta(x), \gamma(x), \Lambda_i, S_i)$ for which the size of the $R_j$ or any increasing monotonous function of this size or any other function quantitatively evaluating the quality of the estimate of the $T_i$ is maximal (step 48);
give the size of the $R_j$, or the value of any monotonous function of that size or any other function quantitatively evaluating the quality of the estimate of the $T_i$ as a global indicator of the quality of the $D_i$, $\Lambda_i$, $\alpha(x)$, $\beta(x)$, $\gamma(x)$ and $g_i(\alpha(x), \beta(x), \gamma(x), \Lambda_i, S_i)$ (step 50).

One example of an embodiment of the inventive method is the following:
$RSF_i(x)$ is estimated using the Frouin et al. method;
$J=I$ and $j=i$;
the $D_i$ are defined as the space domains defined by the segmentation using a method based on the local mean analysis (LMA) proposed by Maroy et al. in the article "Segmentation of Rodent Whole-Body Dynamic PET Images: An Unsupervised Method Based on Voxel Dynamics," *IEEE Trans. Med. Imaging*, 2008;
$\Lambda_i$ is the set of voxels $x \in D_i$ extracted during the step for extracting local minima from the image $\hat{\alpha}_p^2$ measuring, at each voxel p, the homogeneity of the tracer concentration in the vicinity of p;
$\alpha(x)$ is the order of the voxels sorted by increasing $\hat{\alpha}_x^2$;
$\beta(x)$ is the order of the voxels sorted by decreasing $RSF_i(x)$;
$g_i(\alpha(x), \beta(x), \gamma(x), \Lambda_i, S_i)$ is the order of x among the voxels $x \in D_i$ from which the voxels of $S_i$ are excluded and which are sorted by increasing $(a \times \alpha^2(x) + (1-a) \times \beta^2(x))$. In that order, the rank of the voxels not verifying (C1) is shifted until they can verify (C1);
$\Delta_k = \{\delta_i\}_{1 \leq i \leq I}$, where $\delta_i$ is the elementary modification, which consists of adding $d_i$ voxels to the region of interest $R_i$;
$\tau_{opt}$ is the frame for which one optimizes the $\{R_j\}_{1 \leq i \leq I}$ and $\tau_{mes}$ is a frame where one estimates the $\{T_i\}_{1 \leq i \leq I}$;
let L be a scale level and $L_{max}$ the maximum scale level, set a priori (for example $L_{max}=T/4$). A set $F_L$ of L+1 consecutive frames at scale level L, these L frames being centered on $\tau_{opt}$, is associated with the frame $\tau_{opt}$ at scale level 0;
let $p_{i,L}$ be the p-value associated with the statistic t $$\sum_{\tau_{meas} \in F_L} \left( \sum_{l=1}^{k-1} \left( \frac{T_{i,k,\tau_{opt},\tau_{mes}}^{(\delta_{opt})} - T_{i,l,\tau_{opt},\tau_{mes}}}{\sqrt{\xi_{i,k,\tau_{opt},\tau_{mes}}^{2(\delta_{opt})} + \xi_{i,l,\tau_{opt},\tau_{mes}}^2}} \right) \right);$$

$$h\left( \begin{array}{c} \{T_{i,k,\tau_{opt},\tau_{mes}}^{(\delta_{opt})}\}_{1 \leq \tau_{mes} \leq T, 1 \leq i \leq I}, \{\xi_{i,k,\tau_{opt},\tau_{mes}}^{2(\delta_{opt})}\}_{1 \leq \tau_{mes} \leq T, 1 \leq i \leq I}, \\ \{T_{i,l,\tau_{opt},\tau_{mes}}\}_{1 \leq l < k, 1 \leq \tau_{mes} \leq T, 1 \leq i \leq I}, \{\xi_{i,l,\tau_{opt},\tau_{mes}}^2\}_{1 \leq l < k, 1 \leq \tau_{mes} \leq T, 1 \leq i \leq I} \end{array} \right) =$$

$$\min_{1 \leq i \leq I} \left( \min_L (p_{i,L}) \right).$$

The algorithm is as follows.
In the initialization step:
$\delta_i = 0.001 \times \#D_i$, where $\#D_i$ is the cardinal of the segmented space domain $D_i$, $n_{i,0,\tau_{opt}} = \delta_i$, $R_i$ is initialized by $$R_{i,S_{i,0},\tau_{opt}}^{(n_{i,0,\tau_{opt}})}$$

and $S_{i,0}$ is an empty set.
Upon each iteration k and for every i:
one calculates $$\{t_i^{(\delta_i)}\}_{1 \leq i \leq I}, W, \{T_{i,k,\tau_{opt},\tau_{mes}}^{(\delta_i)}\}_{1 \leq \tau_{mes} \leq T, 1 \leq i \leq I}, \{\xi_{i,k,\tau_{opt},\tau_{mes}}^{2(\delta_i)}\}_{1 \leq \tau_{mes} \leq T, 1 \leq i \leq I} \text{ and}$$

$$h\left( \begin{array}{c} \{T_{i,k,\tau_{opt},\tau_{mes}}^{(\delta_i)}\}_{1 \leq \tau_{mes} \leq T, 1 \leq i \leq I}, \{\xi_{i,k,\tau_{opt},\tau_{mes}}^{2(\delta_i)}\}_{1 \leq \tau_{mes} \leq T, 1 \leq i \leq I}, \\ \{T_{i,l,\tau_{opt},\tau_{mes}}\}_{1 \leq l < k, 1 \leq \tau_{mes} \leq T, 1 \leq i \leq I}, \{\xi_{i,l,\tau_{opt},\tau_{mes}}^2\}_{1 \leq l < k, 1 \leq \tau_{mes} \leq T, 1 \leq i \leq I} \end{array} \right); \text{ and}$$

let $\hat{i} = \underset{1 \leq i \leq I}{\mathrm{argmax}}$ $$\left( h\left( \begin{array}{c} \{T_{i,k,\tau_{opt},\tau_{mes}}^{(\delta_i)}\}_{1 \leq \tau_{mes} \leq T, 1 \leq i \leq I}, \{\xi_{i,k,\tau_{opt},\tau_{mes}}^{2(\delta_i)}\}_{1 \leq \tau_{mes} \leq T, 1 \leq i \leq I}, \\ \{T_{i,l,\tau_{opt},\tau_{mes}}\}_{1 \leq l < k, 1 \leq \tau_{mes} \leq T, 1 \leq i \leq I}, \{\xi_{i,l,\tau_{opt},\tau_{mes}}^2\}_{1 \leq l < k, 1 \leq \tau_{mes} \leq T, 1 \leq i \leq I} \end{array} \right) \right).$$

If $h\left( \begin{array}{c} \{T_{i,k,\tau_{opt},\tau_{mes}}^{(\delta_i)}\}_{1 \leq \tau_{mes} \leq T, 1 \leq i \leq I}, \{\xi_{i,k,\tau_{opt},\tau_{mes}}^{2(\delta_i)}\}_{1 \leq \tau_{mes} \leq T, 1 \leq i \leq I}, \\ \{T_{i,l,\tau_{opt},\tau_{mes}}\}_{1 \leq l < k, 1 \leq \tau_{mes} \leq T, 1 \leq i \leq I}, \{\xi_{i,l,\tau_{opt},\tau_{mes}}^2\}_{1 \leq l < k, 1 \leq \tau_{mes} \leq T, 1 \leq i \leq I} \end{array} \right) > h_{min}$, then $d_i$ voxels are added to $n_{i,k,\tau_{opt}}$, $$R_{i,S_{i,k,\tau_{opt}}}^{(n_{i,k,\tau_{opt}})}$$

is redetermined and one moves on to the following iteration k+1.

Otherwise, if $d_i > 1$, $d_i$ is decreased and another iteration is tried.

Otherwise, if $\#S_i < s_{max}$, the $d_i$ above voxels are added to $S_i$, $d_i$ is increased and another iteration is tried.

Otherwise, the algorithm is stopped and the solution is:

$$\{n_{i,\tau_{opt}}\}_{1 \leq i \leq I} = \{n_{i,k-1,\tau_{opt}}\}_{1 \leq i \leq I};$$

$$R_i = R_{i,S_{i,k-1,\tau_{opt}}}^{(n_{i,k-1,\tau_{opt}})};$$

$$\{T_{i,\tau_{opt}}\}_{1 \leq i \leq I} = \{T_{i,k-1,\tau_{opt},\tau_{opt}}\}_{1 \leq i \leq I}; \text{ and}$$

$$\{\xi_{i,\tau_{opt}}^2\}_{1 \leq i \leq I} = \{\xi_{i,k-1,\tau_{opt},\tau_{opt}}^2\}_{1 \leq i \leq I}.$$

The results were obtained with the following material.
For the simulation, we simulated, using an analytical simulator, fifty PET acquisitions of the MOBY mouse phantom on a PET scanner dedicated to small animals (the simulated scanner was the FOCUS 220 by Siemens with a spatial resolution of 1.3 mm), with time frames of one minute each. The images were reconstructed using the OSEM (Ordered Subsets Expectation Maximization) method, which is a traditional PET image reconstruction method, with voxels of 0.5× 0.5×0.8 mm$^3$.

The experimental data include sixteen mice injected with human peritoneal tumor xenografts. The mice received an injection of Fluoro-thymidine (18F-FLT), immediately followed by a PET acquisition of 5400 min made up of 18 time frames (five one-minute frames, five two-minute frames, three five-minute frames, three ten-minute frames, and two fifteen-minute frames). The images were reconstructed using the OSEM method with voxels of 0.5×0.5×0.8 mm$^3$. The mice were sacrificed immediately after the acquisition, and the tracer concentration was counted in the sampled organs. This concentration counted in the organs served as a "gold standard" for the concentration estimated at the end of the acquisition.

Figures 7A, 7B:
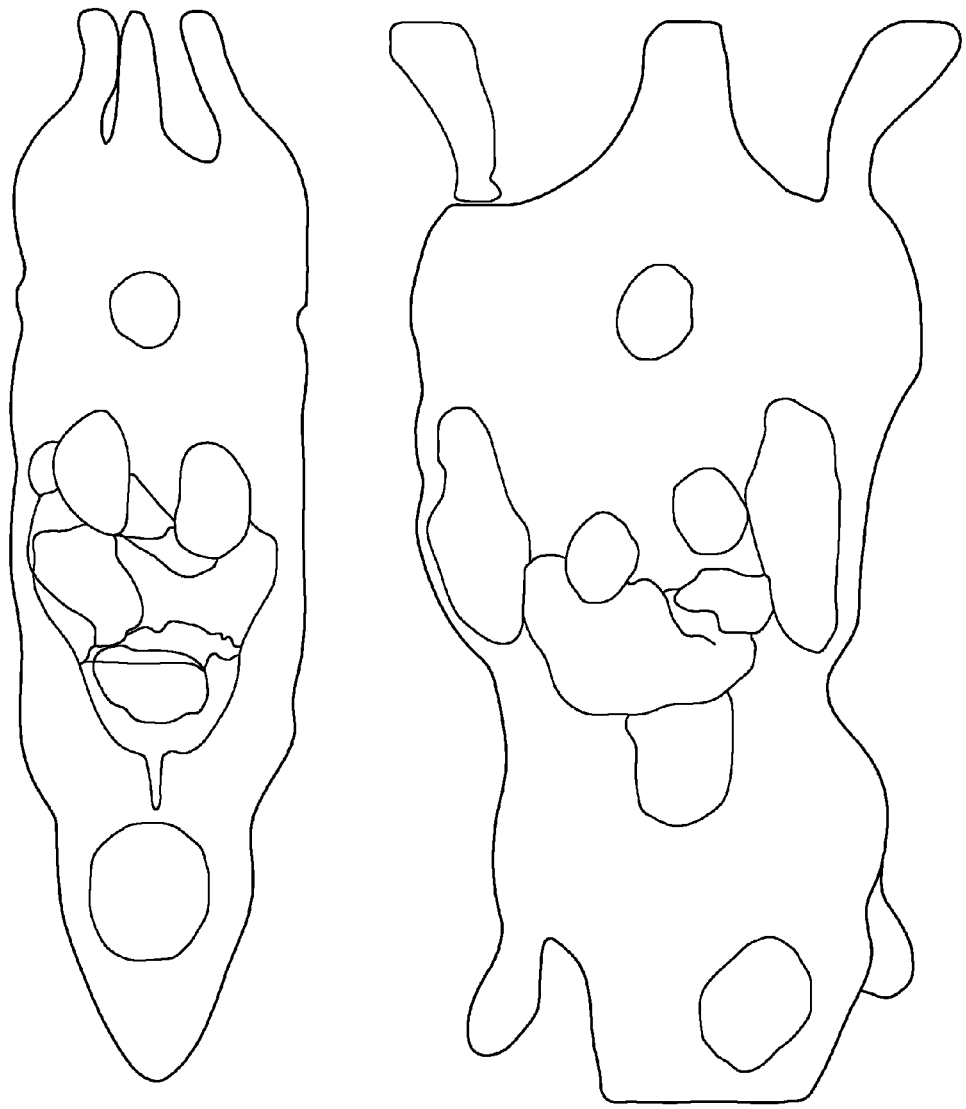

The PET images were segmented using the LMA method (FIG. 7A for the simulation and FIG. 7B for the experimental data).

The estimation of the tracer concentration in the organs is done using three methods:
 calculating the average TAC within the segmented space domain corresponding to the organ;
 partial volume correction carried out via the GTM method implemented in the image space as described by Frouin et al. (simply called "GTM" hereafter); and
 partial volume correction carried out using the method proposed in the example embodiment of the present invention (called "LMA-GTM" hereafter).

The GTM and LMA-GTM methods were compared based on:
 ETR: which is the absolute value deviation between the corresponding measurement of the gold standard and the measured value, expressed in percentage of the gold standard measurement; and
 ARC: which is the apparent recovery coefficient, in other words, the measured value divided by the corresponding value of the gold standard.

Figure 8A:
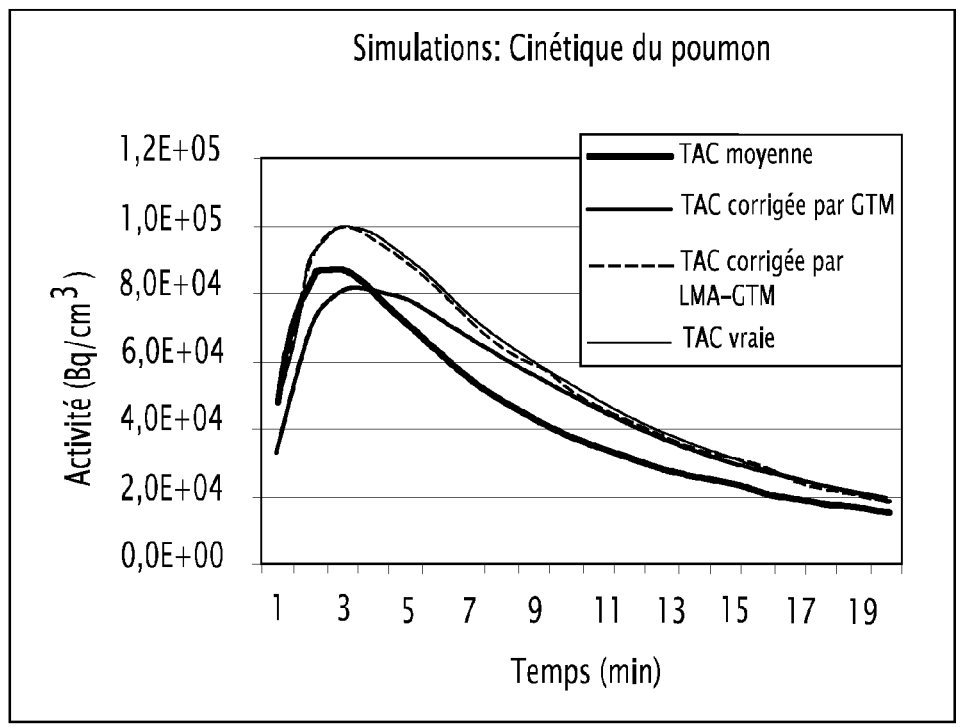
Figure 8B:
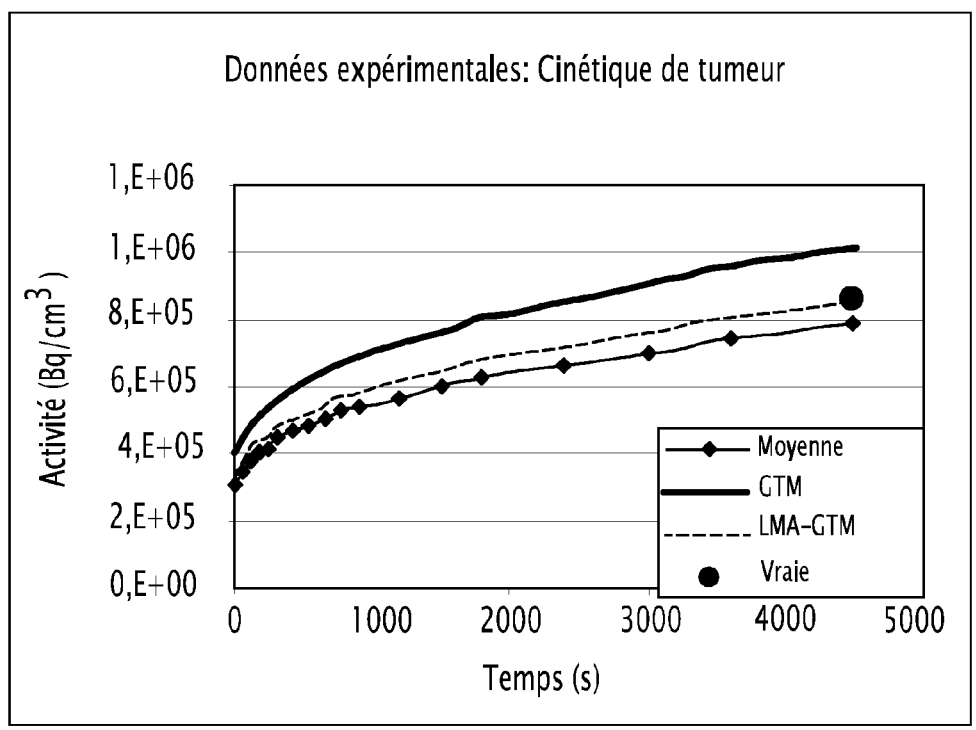

FIGS. 8A and 8B show examples of time variation of the tracer concentration (TACs) estimated for the simulations (FIG. 8A) and for the experimental data (8B).

Figure 9A:
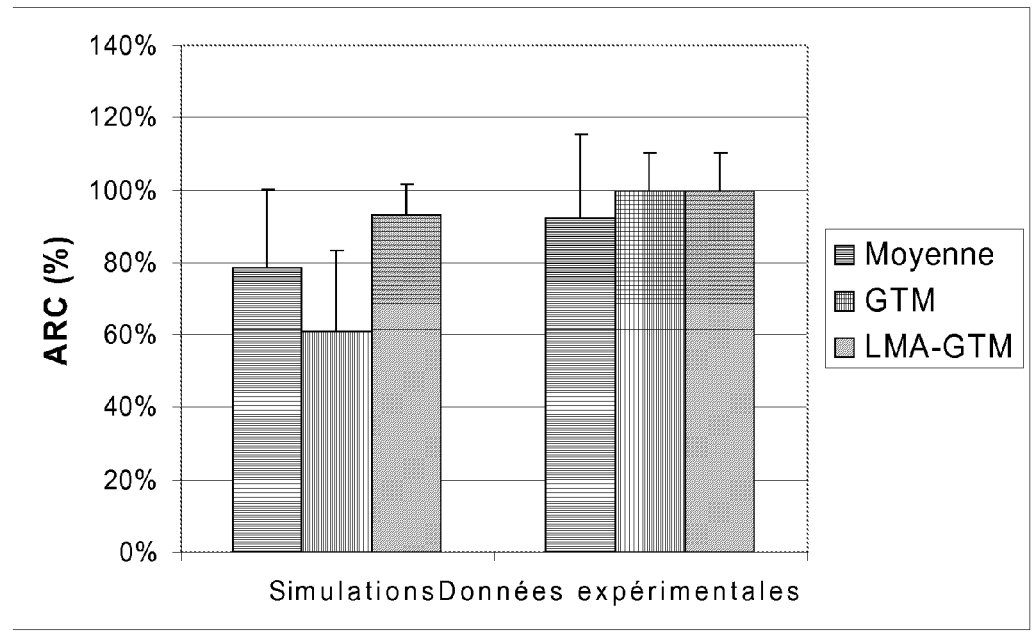
Figure 9B:
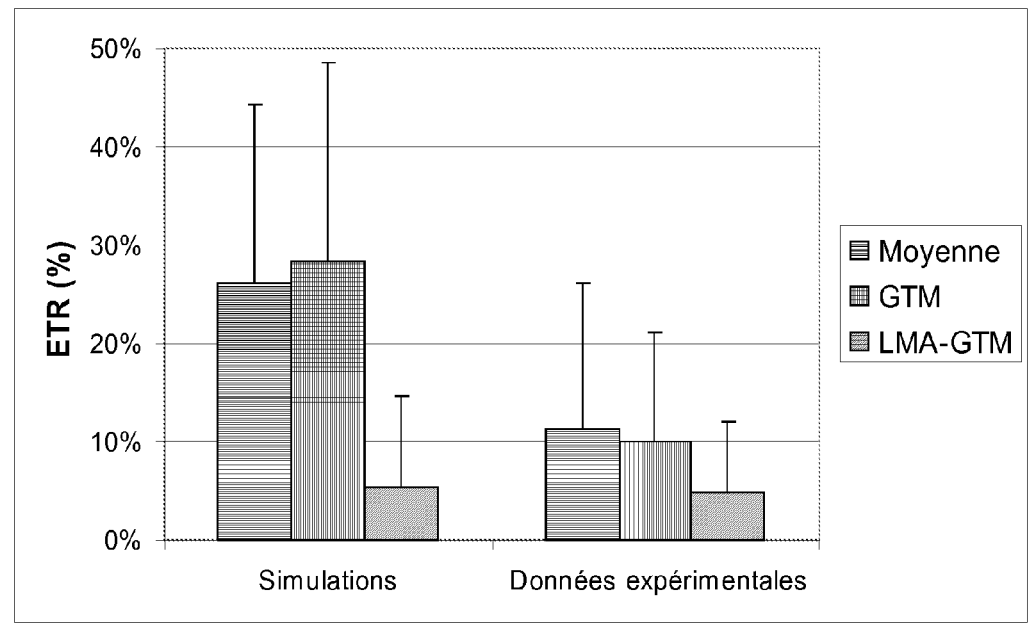

FIGS. 9A and 9B show that the LMA-GTA method significantly improves the precision of the measurements (the p-value is less than $10^{-5}$ both for the simulations and the experimental data) and that the GTM method only improves the TACs extracted for only the experimental data.

The precision of measurements estimated using the LMA-GTM method is good (ETRs$_{Simulations}$=5.3%±8% and ETR$_{Données\ expérimentales}$=4.8%±7%) and the apparent contrast is correctly recovered (ARC$_{Simulations}$=94%±10% and ARC$_{Données\ expérimentales}$=99.98%±9%).

The results obtained using the LMA-GTM method are significantly better in terms of ARC and ETR than those obtained using the GTM method (the p-value is less than $10^{-5}$).

The complete process of extracting corrected TAC from the partial volume takes 10 minutes per image:
 segmentation (~15 seconds);
 naming of the organs by the user (~5 minutes); and
 partial volume correction (~4 minutes).

Figure 10A:
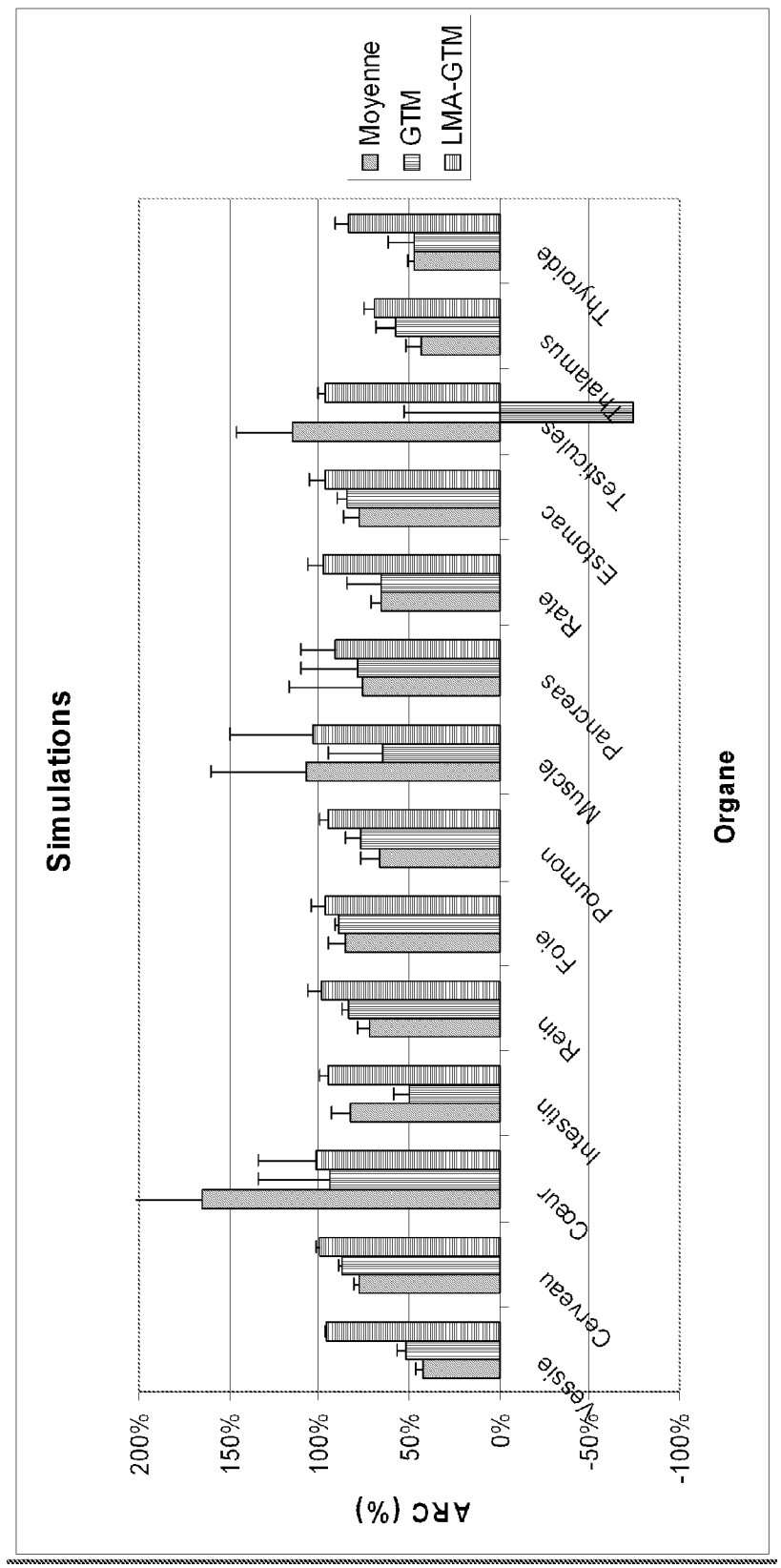

FIG. 10A shows the ARC obtained by the three methods on the simulation images for each organ.

For the LMA-GTM method, the ARC varies between 94%±5% and 99.3%±1% for all of the organs with the exception of the small organs, such as the thalamus and the thyroid, and the pancreas due to its shape.

Figure 10B:
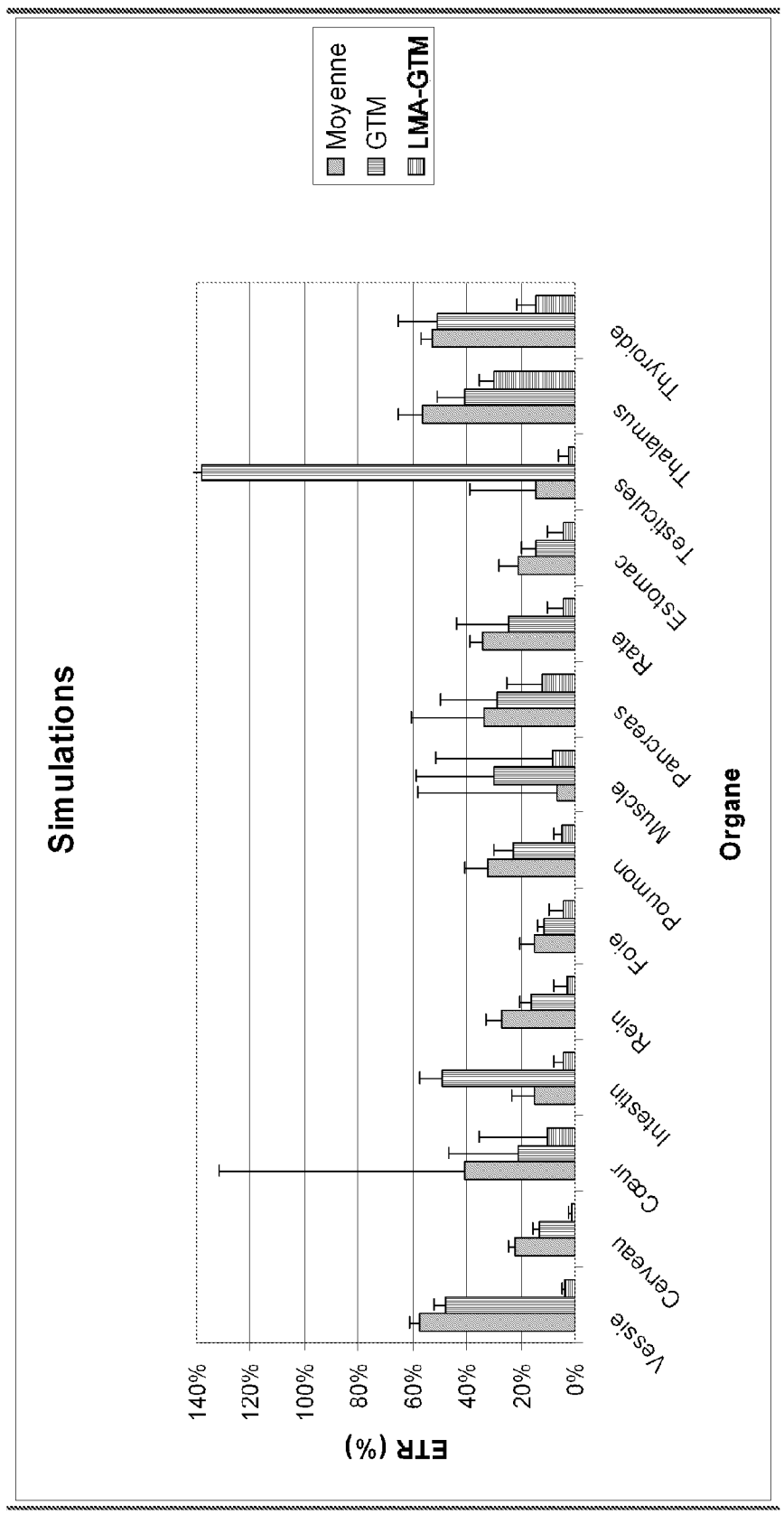

The ETR (FIG. 10B) is below 10% of the true value for all of the organs except the thalamus (ETR=32%±5%) and the thyroid (ETR=21%±6%).

The precision obtained using the LMA-GTM method is better than that obtained by calculating the average TAC and using the GTM method, and with a p-value below $10^{-5}$ for all of the organs.

The results obtained for the experimental data are similar to those obtained for the simulations.

Figure 11A:
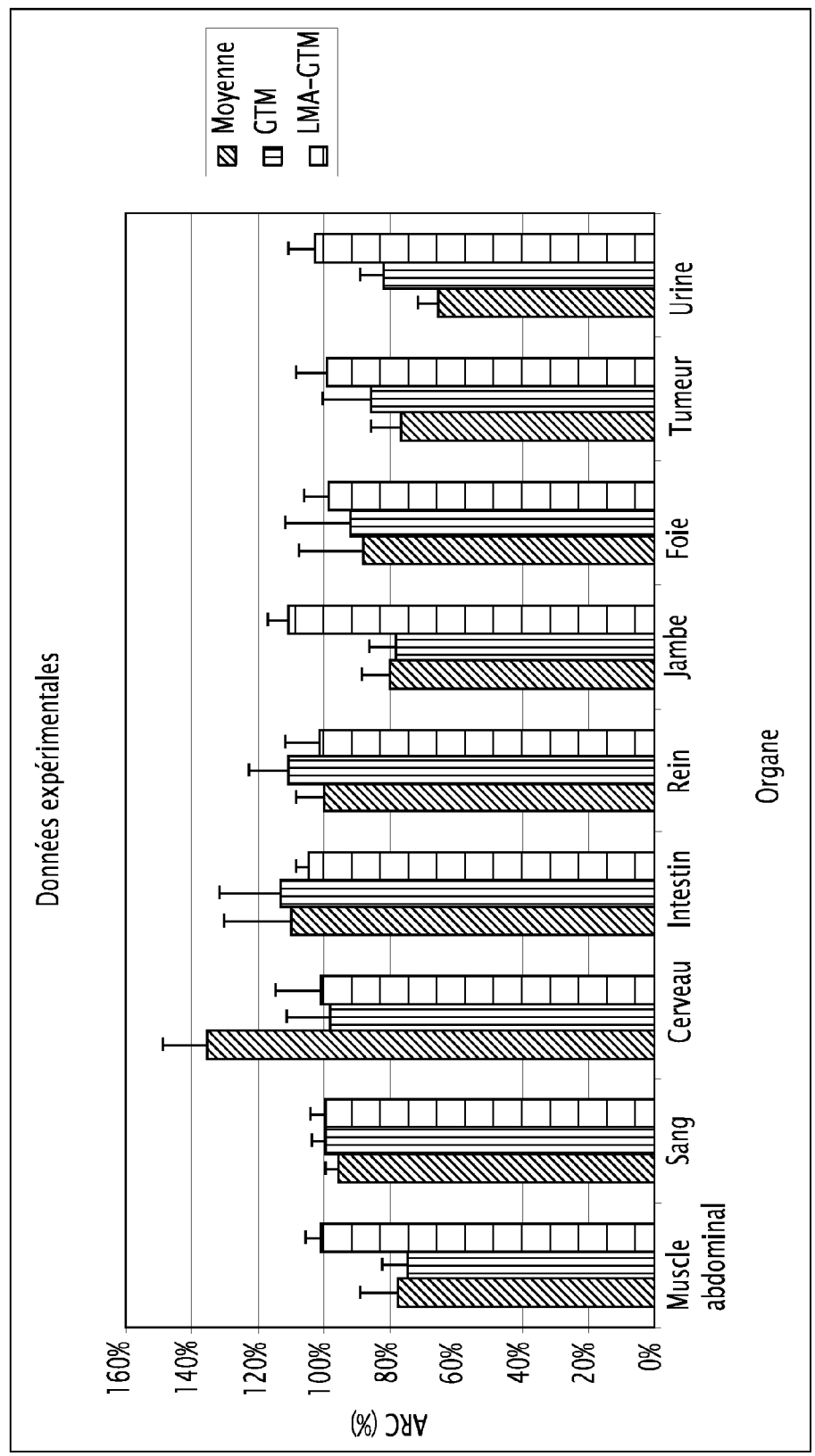

The contrast recovery (FIG. 11A) was good (between 98.4%±7% and 110%±6%).

Figure 11B:
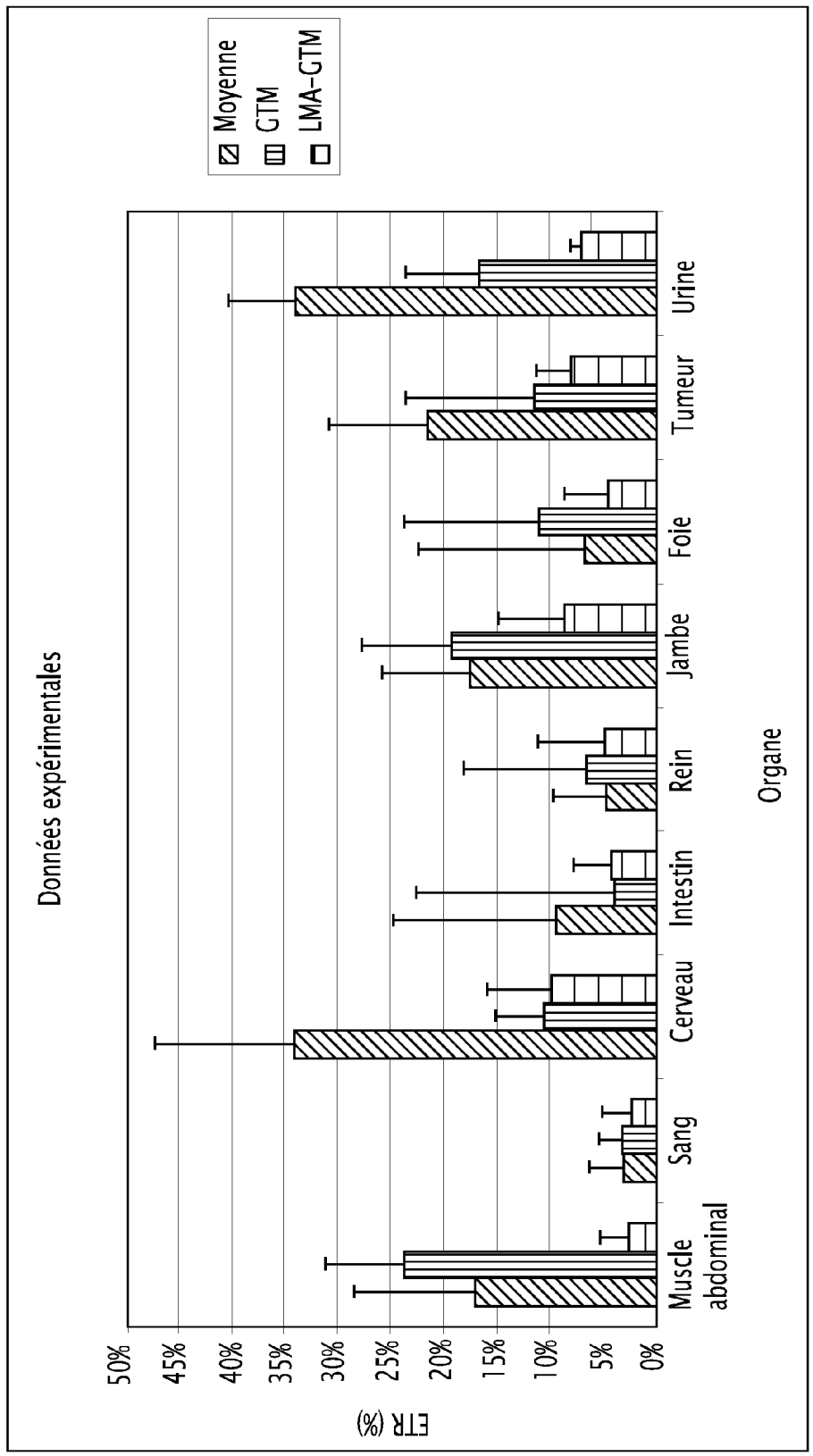

Furthermore, the ETR (FIG. 11B) was below 10% for the LMA-GTM method for all of the organs.

In both cases, the LMA-GTM method obtains better results than the GTM method (p-value less than 0.002).

For brain studies, the GTM method is considered one or even the reference method for correcting the partial volume effect in PET images.

For studies in rodents, to our knowledge there is no generic method (applicable to all tracers and all pathologies) for partial volume correction.

The LMA-GTM method shows strong potential for such studies, but also probably for studies in humans, in whole-body or brain images.

Indeed, the LMA-GTM method:
 uses the LMA automatic definition of organs in the PET images;
 does not require anatomical or a priori information;
 is robust to segmentation errors and errors due to effects that cannot be modeled by the PVE correction; and
 is fast, easy to use, and precise.

The present invention therefore proposes a method making it possible to reliably and precisely estimate the concentration of a tracer in a tissue structure assembly by optimally defining the regions of interest in which the tracer concentration is measured.

The invention claimed is:

1. A method for estimating the concentration of a tracer in a tissue structure assembly including at least one tissue structure, from a measurement image of the tracer concentration in said tissue structure assembly, which is obtained by an imaging apparatus, the image comprising at least one space domain ($D_i$) inside which the tracer concentration is homogenous and at least one region of interest ($R_j$) inside which the tracer concentration is measured, the method comprising:
 determining a geometric transfer matrix (W) having coefficients ($w_{i,j}$) representative of the contribution of the space domains ($D_i$) in the measurement of the tracer concentration in the regions of interest ($R_j$);
 optimizing the coefficients ($w_{i,j}$) of the geometric transfer matrix (W) by defining the best regions of interest ($R_j$) in terms of errors in order to measure the tracer concentration, the definition of the regions of interest ($R_j$) being carried out according to an iterative loop that includes the following steps upon each iteration (k):
  modifying the regions of interest ($R_j$); and
  calculating the coefficients ($w_{i,j}$) of the geometric transfer matrix (W) from the modified regions of interest ($R_j$);
 selecting an optimized geometric transfer matrix (W) among the calculated geometric transfer matrices (W); and estimating the tracer concentration from the optimized geometric transfer matrix (W).

2. The method according to claim 1, wherein the modifying the regions of interest ($R_j$) comprises the addition and/or exclusion of at least one image element (x).

3. The method according to claim 1, wherein the iterative loop for defining the regions of interest ($R_j$) comprises, for each iteration (k):
  determining a set of elementary modifications (δ) each including adding at least one image element (x) to the regions of interest ($R_j$);
  estimating, for each elementary modification (s), the tracer concentration in the regions of interest ($R_j$) modified by the elementary modification (s);
  evaluating, for each elementary modification (s), a criterion (h) making it possible to compare the estimated tracer concentration with the tracer concentrations estimated in at least one preceding iteration;
  selecting the elementary modification ($δ_{opt}$) yielding a tracer concentration estimate closest to the tracer concentrations estimated in the preceding iterations;
  comparing the criterion (h) corresponding to the selected elementary modification ($δ_{opt}$) with a predetermined threshold ($h_{min}$); and
  selectively applying or not applying the selected elementary modification ($δ_{opt}$) or stopping the iterative loop as a function of the result of the comparison of the criterion (h) with the threshold ($h_{min}$).

4. The method according to claim 1, further comprising ordering image elements (x) in each space domain ($D_i$) as a function of order criteria making it possible to evaluate a risk of introducing errors not due to noise into the tracer concentration estimate.

5. The method according to claim 4, wherein the order criteria comprise at least one of (a) a first criterion ($α(x)$) making it possible to define whether the concentration contained in the image element (x) comes from one or more different spatial domains ($D_i$), (b) a second criterion ($β(x)$) making it possible to define whether the image element (x) participates in the calculation of the non-diagonal elements of the geometric transfer matrix (W), and (c) a third criterion ($γ(x)$) making it possible to define whether the image element (x) is reliable for estimating the tracer concentration.

6. The method according to claim 5, wherein the first criterion ($α(x)$) makes it possible to measure the homogeneity of the tracer concentration near the image element (x), the second criterion ($β(x)$) makes it possible to measure the contribution of the space domains ($D_i$) to the measurement of the tracer concentration in the image element (x), and the third criterion ($γ(x)$) is obtained from a probabilistic atlas.

7. The method according to claim 4, wherein the iterative loop for defining the regions of interest ($R_j$) is carried out following the order of the image elements (x) obtained in the ordering step.

8. The method according to claim 1, further comprising estimating a point spread function (PSF) of the imaging apparatus at any point of the imaging apparatus's field of view.

9. The method according to claim 8, wherein the estimating the point spread function (PSF) comprises:
  measuring the point spread function (PSF) at several points of the field of view; and
  interpolating and/or extrapolating the obtained measurements.

10. The method according to claim 8, further comprising estimating a region spread function (RSF) for each space domain ($D_i$) by convolution of the point spread function (PSF) with each space domain ($D_i$).

11. The method according to claim 1, further comprising calculating the size of the regions of interest ($R_j$).

12. The method according to claim 11, further comprising delimiting space domains ($D_i$) so as to obtain regions of interest ($R_j$) with a maximum size.

13. The method according to claim 11, further comprising:
  ordering image elements (x) in each space domain ($D_i$) as a function of order criteria making it possible to evaluate a risk of introducing errors not due to noise into the tracer concentration estimate; and
  optimizing the order criteria so as to obtain regions of interest ($R_j$) with a maximum size.

14. The method according to claim 1, wherein the measurement image of the tracer concentration in the tissue structure is a sequence of matched three-dimensional images and includes at least one three-dimensional image, and the image elements (x) are voxels.

15. The method according to claim 14, wherein the at least one three-dimensional image is obtained by positron emission tomography.

16. A non-transitory computer-readable medium including a computer-executable code to estimate the concentration of a tracer in a tissue structure assembly including at least one tissue structure from a measurement image of the tracer concentration in the tissue structure assembly obtained by an imaging apparatus, the image including at least one space domain ($D_i$) inside which the tracer concentration is homogenous and at least one region of interest ($R_j$) inside which the tracer concentration is measured, the code comprising computer-executable instructions to perform a method when the instructions are executed by a data processing system, the method comprising:
  determining a geometric transfer matrix (W) having coefficients ($w_{i,j}$) representative of the contribution of the space domains ($D_i$) in the measurement of the tracer concentration in the regions of interest ($R_j$);
  optimizing the coefficients ($w_{i,j}$) of the geometric transfer matrix (W) by defining the best regions of interest ($R_j$) in terms of errors in order to measure the tracer concentration, the definition of the regions of interest ($R_j$) being carried out according to an iterative loop that includes the following steps upon each iteration (k):
    modifying the regions of interest ($R_j$); and
    calculating the coefficients ($w_{i,j}$) of the geometric transfer matrix (W) from the modified regions of interest ($R_j$);
  selecting an optimized geometric transfer matrix (W) among the calculated geometric transfer matrices (W); and
  estimating the tracer concentration from the optimized geometric transfer matrix (W).

17. A device configured to estimate the concentration of a tracer in a tissue structure assembly including at least one tissue structure from a measurement image of the tracer concentration in the tissue structure assembly obtained by an imaging apparatus, the image including at least one space domain ($D_i$) inside which the tracer concentration is homogenous and at least one region of interest ($R_j$) inside which the tracer concentration is measured, the device comprising:
  the imaging apparatus; and
  a data processing system programmed to:
    determine a geometric transfer matrix (W) having coefficients ($w_{i,j}$) representative of the contribution of the space domains ($D_i$) in the measurement of the tracer concentration in the regions of interest ($R_j$);
    optimize the coefficients ($w_{i,j}$) of the geometric transfer matrix (W) by defining the best regions of interest ($R_j$)

in terms of errors in order to measure the tracer concentration, the definition of the regions of interest ($R_j$) being carried out according to an iterative loop that includes the following steps upon each iteration (k):

modifying the regions of interest ($R_j$); and calculating the coefficients ($w_{i,j}$) of the geometric transfer matrix (W) from the modified regions of interest ($R_j$);

select an optimized geometric transfer matrix (W) among the calculated geometric transfer matrices (W); and estimate the tracer concentration from the optimized geometric transfer matrix (W).

* * * * *